United States Patent Office 3,299,121
Patented Jan. 17, 1967

3,299,121
THIO BIS (MONO ALKYL ESTER SUCCINATE SALTS AND AMIDES OF PRIMARY AMINES)
Billy D. Vineyard, Bellefontaine Neighbors, Mo., assignor to Monsanto Company, a corporation of Delaware
No Drawing. Filed Nov. 6, 1961, Ser. No. 150,202
2 Claims. (Cl. 260—481)

This invention relates to novel thioesters, their nitrogen derivatives and methods of preparing the same. More particularly, the invention relates to novel thio bis half esters, their nitrogenous derivatives and to methods of preparing the esters and derivatives.

Specifically, the invention is directed to thio bis half esters of succinic acids and nitrogenization products thereof. The nitrogenization products encompassed by this invention include acid succinate amine salts, succinimides and succinamates. The acid or half esters possess utility as oxidation inhibitors in lubricating oil compositions. In addition, they have a unique utility as intermediates for the preparation of the amine derivatives of the thio bis half esters. The amine derivatives of these half esters are also lube oil additives, serving a dual role as detergent-dispersants and as antioxidants.

It is therefore an object of this invention to provide new and novel thio bis (acid esters) and their amine derivatives. A more specific object of this invention is to provide novel thio bis (acid succinates), and esteramides, imides and acid amine salts derived therefrom.

In accordance with this invention these and other objects are accomplished, generally speaking, by reacting hydrogen sulfide in the presence of a basic catalyst with an acid or half ester of maleic, citraconic or itaconic acid to obtain the corresponding thio bis (acid succinate) or bis (acid methyl-succinate). The thioesters thus prepared can be employed as anti-oxidant oil additives, or can be readily nitrogenized in the synthesis of their amine derivatives.

More specifically this invention contemplates the preparation of the thioesters under consideration by a process wherein hydrogen sulfide, a basic catalyst, and an acid or half ester of maleic, citraconic or itaconic acid are placed in intimate contact and the contact maintained until the reaction between them is substantially complete and the reactants converted to the corresponding thio bis (acid succinate). The requisite intimate contact is preferably obtained by preparing a solution of the reactants and the catalysts, or by passing hydrogen sulfide through a solution of the acid ester and the basic catalyst. However, when hydrogen sulfide and the acid ester are mutually soluble, the inert solvent and recovery problems attendant thereto can be completely eliminated.

The reaction between hydrogen sulfide and the acid maleate can be normally carried out at room temperature, that is about 20° C., but it may be preferred to accelerate the reaction by utilizing a somewhat higher temperature. Generally speaking, the temperatures employed are in the range between room temperature and the boiling point of the reaction mixture. After the reaction has gone to completion, the residual thio bis (acid succinate) produced can be best recovered by removal of the solvent medium by conventional means, such as vacuum distillation.

A variety of organic solvents or solvent mixtures, either polar or non-polar, can be used in accordance with this invention. It is only necessary that they be capable of dissolving the reactants and the catalysts while not reacting with them. Suitable non-polar solvents include benzene, toluene, xylene, chloroform, carbon tetrachloride and the like. Satisfactory polar solvents include water, dioxane, tetrahydrofuran, acetone, ethyl methyl ketone, diethyl ether, glycol dimethyl ether, mixtures of dioxane and dimethylformamide and the like. The amount of solvent is not particularly critical but must be sufficient to insure substantial solution of the reactants and the catalysts. For economic reasons, however, it is preferred to maintain the amount of solvent to a minimum so as to eliminate excessive costs in its subsequent removal.

Preferably, when the reaction is executed under pressure, one mole of hydrogen sulfide is introduced into the reaction mixture for each two moles of the half ester present. The ratio can, of course, be varied somewhat, but for optimum yields and economy of operation, it is preferred to approximate these proportions. However, for a non-pressure reaction, an excess of hydrogen sulfide is passed through a solution of the half ester until the reaction is complete. This excess compensates for any hydrogen sulfide that passes through the reaction mixture without reacting with the acid maleate.

The basic catalyst used in the preparation of the thio bis (acid esters) can be any of a wide variety of basic components. For example, one may use a tertiary amine, such as triethylamine, benzyldimethylamine, triethylenediamine, pyridine and the like. However, alkali metal alkoxides and alkaline earth metal alkoxides, such as sodium methylate, potassium ethylate, alkali metal thiolates and alkaline earth metal thiolates, such as sodium methylthiolate, lithium ethylthiolate, alkali and alkaline earth metal salts of phenols and thiophenols, including sodium phenate, sodium thiophenate and anhydrous quarternary ammonium hydroxides, such as trimethyl benzyl ammonium hydroxide and the like can be used with equal facility. Other bases such as sodium amide, lithium amide, sodium hydride, lithium hydride, sodium sulfide and the like also may be used. It has been found that the reactions of this invention can be executed using as little as about 0.01% catalyst based on the weight of hydrogen sulfide. In most instances, it is preferred to use between about 0.1% and about 3% catalyst to insure efficient catalysis. Larger amounts can, of course, be used, but they serve no useful purpose.

The exact manner in which these catalysts function is not precisely known. It is believed, however, that the mechanism of this reaction may be represented as a Michael type of addition of a thiol anion to a polarized double bond. The apparent function of the base is to effect ionization of hydrogen sulfide to its anion.

The following reaction is illustrative of the preparation of thio bis (acid succinates) by the reaction of hydrogen sulfide with an acid ester of maleic acid:

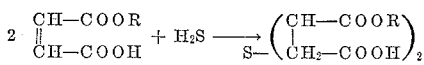

In the above equation R represents a hydrocarbon radical containing between 1 and 20 carbon atoms. This radical may be alkyl, alkenyl, aryl or alkylaryl, and substituted or unsubstituted. The particular nature of radical R and the presence or absence of substituents thereon has little if any effect on the operability of the process. Thus, when it is desired to impart particular characteristics to, or to enhance the properties of the resultant thio bis (acid succinate), R can contain one or more substituents, such as halogens, nitro groups, and the like.

In addition to their utility per se, the thio bis (acid succinates) of the present invention are uniquely useful in the preparation of their novel amine derivatives. In fact, they represent the only group of compounds that can be economically used in the commercial production of such amine oil additives. These amine derivatives are readily prepared by nitrogenization of the thio bis (acid succinates). This is accomplished in the case of the acid succinate-amine salts and of the succinimides by reacting the thio bis (acid succinate) directly with an amine. The type of derivative obtained by the reaction is dependent upon the operating conditions. When relatively mild temperatures and short reaction times are used, the acid succinate-amine salts are formed. Conversely, higher temperatures and longer reaction times result in the formation of the corresponding succinimide. In the preparation of the succinamates, it is generally preferred to convert the thio bis (acid succinate) to the corresponding acid chloride, and then to react the acid chloride with an amine. In the acid chloride conversion, it is preferred to use an excess of thionyl chloride or other halogenating agent. The nitrogenization reactions are generally conducted in solvents of the type described above in connection with the thio bis (acid succinate) formation.

The following equations are representative of those required for the preparation of (a) acid succinate-amine salts, (b) succinate-acid chlorides, (b') succinamates, and (c) succinimides, respectively:

proportions of the ester-amides and ester-amine salts is formed. On the other hand, temperatures above about 150° C. are difficult to maintain and have objectionable side reactions.

The ester-amides cannot be readily formed by nitrogenizing the acid succinates directly. Thus the thio bis (acid succinates) are converted to the acid halide which is then reacted with an amine to form the ester-amides. It will be noted from the foregoing Equation b' that the amine and acid halide are present in the reaction mixture in molar proportions of approximately 4:1. In executing this process it is preferred to effect the halogenation with thionyl chloride. However, other halogenating agents such as $PCl_5$, $POCl_3$, $PCl_3$ and $SO_2Cl_2$ can be used with equal facility. Although an inert solvent such as a toluene and the like can be used, the solvent is preferably eliminated when the thio bis (acid succinate) and the halogenating agent are mutually miscible. In either event, the reaction mixture is heated to a temperature between about 65° C. and the boiling point of the solvent or of the halogenating agent for about 1 to 3 hours to insure

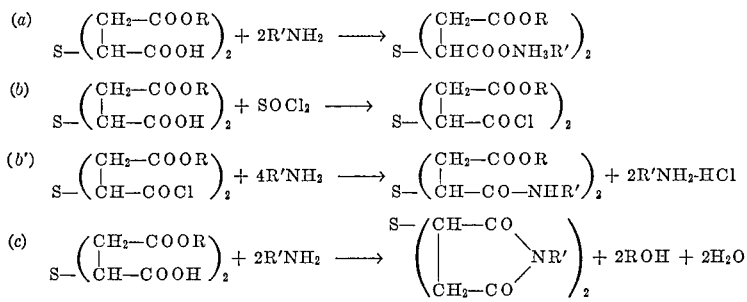

In these reactions R and R' are hydrocarbon radicals containing between 1 and 20 carbon atoms, and preferably a total of at least 12 carbon atoms to insure oil solubility. Here again, the radicals may be alkyl, alkenyl, aryl or alkylaryl, and substituted or unsubstituted. When substituents are present, they may be those enumerated above in connection with the reaction for the formation of the thio bis (acid succinates). Amines of any type can be used in carrying out the process of the first reaction. However, tertiary amines are unsatisfactory in the preparation of the succinamates; and only primary amines can be employed in the formation of the succinimides by the last reaction.

As indicated above the thio bis (acid succinates) react under relatively mild conditions with amines to form the corresponding thio bis (ester-amine salts). In carrying out this reaction, the amine and the succinate are dissolved in a suitable inert solvent in substantially equivalent proportions. Thus it is preferred to use about two moles of the amine for each mole of the thio bis (acid succinate). The reaction can be conducted at room temperature. However, in order to expedite the process it is preferred to use somewhat higher temperatures. It has been found that excellent yields of the ester-amine salts can be obtained when the reaction solution is maintained between about 30° C. and about 70° C. for periods of time within the range of about 30 minutes to about 2 hours. At the end of this period, the residual product is preferably recovered by distillation of the solvent therefrom.

When the reaction conditions are intensified, solutions containing a primary amine and a thio bis (acid succinate) in a molar ratio of about 2:1 result in the formation of the corresponding succinimide. In order to obtain satisfactory yields of the succinimides, the reaction temperature must be maintained between about 120° C. and about 150° C., and the alcohol and water formed removed throughout the course of the reaction. At temperatures below 120° C. the yield of the succinimide drops off appreciably, and a mixed product containing considerable substantial complete conversion to the acid halide. The resultant acid halide is then most conveniently recovered by distillation of the other components of the reaction mixture therefrom.

The ester-acid halide thus obtained is dissolved in a suitable solvent together with an amine, and the reaction mixture maintained until the reaction is substantially complete. The ester-acid halide is readily nitrogenized. Thus the reaction can be conducted at room temperature, or at elevated temperatures up to the boiling point of the reaction solution. At ambient temperature the reaction is generally completed in 4 to 6 hours. When higher temperatures are used, the reaction time can be reduced to about 1 to 2 hours.

The thio bis succinyl compounds of the present invention range in physical properties from clear fluid to oily liquids. Their physical form is apparently dependent at least partially on the size and structure of the groups contained therein. Most of these compounds are insoluble in water, but readily soluble in commercially available organic solvents. Also those having higher molecular weights are soluble or dispersible in all proportions with hydrocarbon lubricating oils. The invention and the manner in which its objects are achieved will be more readily understood by reference to the following preferred embodiments thereof. In these examples and throughout the specification, all proportions are expressed in parts by weight unless otherwise designated.

EXAMPLE I

*2,2'-thio bis(tridecyl acid succinate)*

About 89 grams (0.3 mole) of tridecyl acid maleate and 0.5 gram of triethylamine were dissolved in approximately 200 cc. of toluene. The temperature of the solution adjusted to about 80° C., and hydrogen sulfide was bubbled into the solution at the rate of about 0.1 mole per hour. This addition of hydrogen sulfide was continued for about 6 hours, at which time the reaction was complete. The solvent was then removed from the product by vacuum distillation. The product thus obtained was approximately 93 grams of a clear liquid. This yield represented approximately 100% of theoretical. Upon infrared analysis this material exhibited a broad bond at 1700 to 1730 cm.$^{-1}$ (ester-acid).

Analysis.—Calcd. for $C_{34}H_{62}O_8S$: S, 5.0% neut. equiv., 315. Found: S, 4.5% neut. equiv., 295.

EXAMPLE II

*2,2'-thio bis(ethyl acid succinate)*

Between about 0.1 and about 0.2 mole of hydrogen sulfide and about 0.5 gram triethylamine were dissolved in about 150 cc. of dioxane at a temperature of about 25° C. Then approximately 28.8 grams (0.2 mole) of ethyl acid maleate were added in small increments over an hour and a half period. During this time hydrogen sulfide was also added at a sufficient rate to maintain the solution saturated with respect to this gas. The reaction mixture was then heated to about 40° C. for 8 hours while maintaining the hydrogen sulfide saturation. At the end of this period, the reaction was substantially complete and the solvent removed by vacuum distillation so as to separate it from the residual 2,2'-thio bis(ethyl acid succinate). The identity of this material was confirmed by the analytical procedures used in Example I.

EXAMPLE III

*2,2-thio bis(ethyl acid succinate)*

A solution of about 14.4 grams of ethyl acid maleate and about 0.5 gram of triethyl amine in approximately 150 cc. of dioxane was cooled to about 5° C. The solution was agitated and maintained at this temperature for about 15 hours, while hydrogen sulfide was passed therethrough at a rate within the range of about 0.01 to 0.05 moles per hour. The completion of the reaction and the formation of 2,2'-thio bis(ethyl acid succinate) were confirmed by infrared and chemical analysis. The results of the chemical analyses are as follows:

Analysis.—Calcd. for $C_{12}H_{18}O_8S$: S, 9.9 neut. equiv., 161. Found: S, 9.0 neut. equiv., 151.

EXAMPLE IV

*2,2'-thio bis(ethyl methylsuccinate)*

A solution of approximately 31.6 grams (0.2 mole) of ethyl acid itaconate and about 0.5 grams triethylenediamine in approximately 150 cc. of substantially anhydrous diethyl ether was prepared and cooled to approximately −1 to 0° C. Then about 3.4 grams (0.1 mole) of dry hydrogen sulfide were added. This mixture was maintained in an autoclave at room temperature for approximately 16 hours and subsequently heated to about 50° C. for one hour. The solvent was then removed by distillation leaving the residual product. The following analysis confirmed its identity as thio bis(ethyl methylsuccinate):

Analysis.—Calcd. for $C_{14}H_{22}O_8S$: S, 9.1% neut. equiv., 176. Found: S, 8.7% neut. equiv., 170.

EXAMPLE V

*Thio bis(oleylammonium tridecyl acid succinate)*

About 21.7 grams (0.064 mole) of oleyl amine were added to a solution of about 20 grams (0.032 mole) of thio bis(tridecyl acid succinate) in approximately 150 cc. of toluene at 30° C. This solution was then heated to about 70° C. and maintained at this temperature for approximately 1½ hours, at which time the reaction was substantially complete. Subsequently the toluene was removed by vacuum distillation, yielding approximately 41 grams of an oily liquid material whose analysis showed it to be thio bis(oleylammonium tridecyl acid succinate).

EXAMPLE VI

*Thio bis(oleyl succinimide)*

About 20.3 grams (0.06 mole) of oleyl amine were added to a solution of about 10 grams (0.03 mole) of thio bis (ethyl acid succinate) in approximately 125 cc. of toluene at about 30° C. The resultant reaction mixture was then heated to and maintained within the approximate temperature range of 135–140° C. for about 6 hours. During this period the water and ethanol formed as reaction by-products were continuously removed by means of a suitable trap. At the end of the 6 hour heating interval, the reaction was substantially complete. Subsequently the toluene was removed by distillation and the residual thio bis(oleyl succinimide) was characterized by infrared, nitrogen analysis and acid number.

EXAMPLE VII

*3,3'-thio bis(tridecyl N,N-diethyl succinamate)*

About 15 grams (0.24 mole) of 2,2'-thio bis(tridecyl acid succinate) which was prepared in accordance with Example I were mixed with about 10 grams (0.084 mole) of thionyl chloride and the mixture maintained at a temperature of approximately 70° C. for about 2 hours. The thionyl chloride was then removed by means of a water aspirator and the ester-acid chloride thus obtained characterized by infrared analysis. About 14.2 grams (0.024 mole) of the ester-acid chloride thus obtained were dissolved in approximately 100 cc. of benzene at 15° C. To this solution was slowly added about 7.1 grams (0.096 mole) of diethylamine. The solution was agitated during this addition and the agitation continued for an additional 5 hours at 25° C. The amine hydrochloride formed as a precipitate and was removed by filtration. Then the benzene was removed by distillation leaving as a product about 15 grams of a viscous liquid material. The following analyses of this material showed it to be 3,3'-thio bis (tridecyl N,N-diethyl succinamate):

Infrared band at 1640 cm.$^{-1}$ (amide) and 1725 cm.$^{-1}$ (ester). Percent S found: 5.1%. Calcd. percent S: 4.6%.

In like manner many other thio bis succinyl compounds can be prepared in accordance with the present invention: The following compounds are illustrative of such products:

2,2'-thio bis(diethylammonium tridecyl acid succinate)
2,2'-thio bis(oleylammonium ethyl acid succinate)
thio bis (ethyl succinimide)
thio bis(dodecyl succinimide)
thio bis (3-oleylaminopropyl succinimide)
3,3'-thio bis(tridecyl N,N-dicyclohexyl succinamate)
3,3-thio bis(ethyl N-oleyl succinamate)
3,3'-thio bis(ethyl N,N-diethyl succinamate)
3,3'-thio bis(ethyl N-phenyl succinamate)
2,2'-thio bis(cyclohexylammonium tridecyl acid succinate)
2,2'-thio bis(dimethylammonium tridecyl acid succinate)
2,2'-thio bis(oleylammonium tridecyl acid succinate)
thio bis(stearyl succinimide)
thio bis(oleyl succinimide)
thio bis(3-dimethylaminopropyl succinimide)
thio bis (n-octyl acid succinate)
thio bis (n-propyl acid methylsuccinate)

The terms "succinyl," "succinate" and the like are used in their broadest sense throughout the specifications and in the appended claims. These terms include methyl succinyl and methyl succinate, as well as the unsubstituted succinyl compounds. Thus derivatives of maleic, citraconic and itaconic acids are encompassed by them.

The numerous modifications will readily suggest themselves to those skilled in the art. Thus while the invention has been described with particular reference to specific embodiments, it is to be distinctly understood that it is not limited thereto but is to be construed broadly and restricted solely by the scope of the appended claims.

The embodiments of the invention in which an exclusive property or privilege is claimed are defined as follows:

1. A thio bis (acid succinate amine salt) having the formula

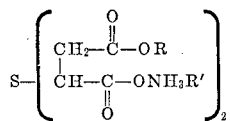

wherein R and R' are alkyl radicals containing between 1 and 20 carbon atoms.

2. A thio bis succinamate having the formula

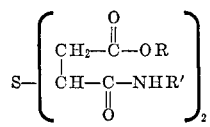

wherein R and R' are alkyl radicals containing between 1 and 20 carbon atoms.

References Cited by the Examiner

UNITED STATES PATENTS

| | | | |
|---|---|---|---|
| 2,603,616 | 7/1952 | Newton | 260—481 |
| 2,845,390 | 7/1958 | Kerschner | 260—481 |
| 2,875,239 | 2/1959 | Holly et al. | 260—481 |
| 2,904,582 | 9/1959 | Gaertner | 260—479 |
| 3,018,290 | 1/1962 | Sauers et al. | 260—326.3 |
| 3,022,314 | 2/1962 | Aspergren et al. | 260—326.3 |

FOREIGN PATENTS

| | | |
|---|---|---|
| 1,001,555 | 10/1951 | France. |
| 859,773 | 1/1961 | Great Britain. |

OTHER REFERENCES

Schwab et al.: Journal of Agricultural and Food Chemistry, vol. 3, No. 6, pages 518–521 (1955), TX 341 J5.

Wagner and Zook: Synthetic Organic Chemistry, John Wiley and Sons, Inc., New York (1953), page 566, QD 262 W24.

RICHARD K. JACKSON, *Primary Examiner.*

IRVING MARCUS, LEON ZITVER, LORRAINE A. WEINBERGER, *Examiners.*

J. TOVAR, I. R. PELLMAN, *Assistant Examiners.*